United States Patent

[11] 3,628,945

[72] Inventor William C. Doyle, Jr.
Leawood, Kans.
[21] Appl. No. 851,432
[22] Filed Aug. 19, 1969
[45] Patented Dec. 21, 1971
[73] Assignee Gulf Research & Development Company
Pittsburgh, Pa.
Continuation-in-part of application Ser. No. 625,603, Mar. 24, 1967, now Patent No. 3,510,290. This application Aug. 19, 1969, Ser. No. 851,432

[54] SELECTIVELY HERBICIDAL 3-SUBSTITUTED-2-HALOPROPYL THIOLCARBAMATES AND METHOD OF COMBATING UNDESIRED VEGETATION
8 Claims, No Drawings
[52] U.S. Cl..................................... 71/100, 71/103, 71/105, 260/455
[51] Int. Cl...................................... A01n 9/12
[50] Field of Search............................ 71/100, 105, 88

[56] References Cited
UNITED STATES PATENTS
3,320,299 5/1967 Popoff.......................... 71/100 X
3,372,179 3/1968 Zienty et al................... 71/100 X
3,510,290 5/1970 Doyle, Jr. .................... 71/100 X Primary Examiner—James O. Thomas, Jr.
Attorneys—Richard L. Kelly, Carl A. Cline, Forrest D. Stine and Richard A. Anderson ABSTRACT: Undesired vegetation, particularly noxious grasses in growing crops, are combated by pre-emergent application of selective herbicides made by reacting an organic compound having a reactive halogen substituent with a 2,3-epithiopropyl N,N-dialkylthiolcarbamate to yield a compound of the structural formula

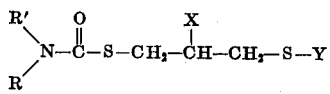

in which R and R' represent hydrocarbon substituents containing less than 10 carbon atoms, X is halogen, preferably bromine or chlorine and Y may be alkanoyl, chloroalkanoyl, bromoalkanoyl, alkoxyalkanoyl, N,N-dialkylcarbamyl, carbalkoxycarbonyl, alkoxymethyl, alkoxyethyl, chlorobenzoyl, bromobenzoyl, chlorophenoxyacetyl, bromophenoxyacetal, cyclopropylcarbonyl, cyano, methanesulfonyl, alkanoylmethyl alkylmercaptomethyl, nitrobenzoyl, chlorocarbalkoxyl, bromocarbalkoxyl, ethynylmethyl, dialkylphosphono, dialkylthiophosphono or alkylmercaptocarbonyl, said alkanoyl, alkoxy, carbalkoxy and alkyl structures containing less than 10 carbon atoms.

SELECTIVELY HERBICIDAL 3-SUBSTITUTED-2-HALOPROPYL THIOLCARBAMATES AND METHOD OF COMBATING UNDESIRED VEGETATION

This application is a continuation-in-part of U.S. Ser. No. 625,603 filed on Mar. 24, 1967 now U.S. Pat. No. 3,510,290.

DESCRIPTION OF THE INVENTION

The prior application is directed to two novel classes of herbicides (II and III) synthesized by means of the reactions illustrated by means of structural formulas as follows:

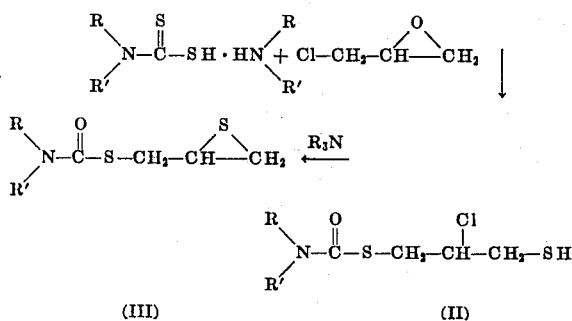

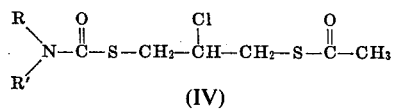

(III)           (II)

It was disclosed in the prior application that both II and III can be reacted with acetyl chloride to yield products which have identical NMR spectra and it was postulated that both products are the same compound having the following structural formula:

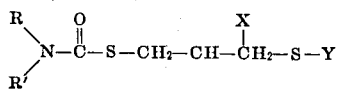

(IV)

It has now been discovered that compounds of the type represented by structural formula III may be reacted with organic compounds having reactive halogen substituents to yield a new class of selective herbicides having the generic structural formula:

$$\underset{R'}{\overset{R}{\diagdown}}N-\overset{O}{\overset{\|}{C}}-S-CH_2-\overset{X}{\underset{|}{CH}}-CH_2-S-Y$$

in which R and R' represent hydrocarbon substituents containing less than 10 carbon atoms, X is halogen, preferably bromine or chlorine and Y may be alkanoyl, chloroalkanoyl, bromoalkanoyl, alkoxyalkanoyl, N,N-dialkylcarbamyl, carbalkoxycarbonyl alkoxymethyl, alkoxyethyl, halobenzoyl, halophenoxyacetyl, cyclopropylcarbonyl, cyano, methanesulfonyl, alkanoylmethyl, alkylmercaptomethyl, nitrobenzoyl, halocarbalkoxyl, ethynylmethyl, dialkylphosphono, dialkylthiophosphono or alkylmercaptocarbonyl, said alkanoyl, alkyl, alkoxy and carbalkoxy groups containing less than 10 carbon atoms.

A great deal of variation is possible in the Y substituent of the above general formula, so as to vary the physical and biochemical properties of the new class of herbicides. In the discussion below there are presented data which show variation in phytotoxicity ranging from pre-emergent action selective to one or two particular grasses to broad activity, both post and pre-emergent, toward many species, with relatively less activity toward a small number of crops. The critical factor in successful preparation of this class of herbicides appears to be the use of an organohalogen compound having a sufficiently reactive halogen-to-carbon bond. This puts practical limits on choice of the Y groups, which, of course, is the organic nucleus to which the reactive halogen is attached.

Active halogen compounds which may be used include cyanogen halides, alkanesulfonyl halides, alpha-haloethers, propargyl halides, alpha-haloketones and halothioethers, acid halides of both aliphatic and aromatic carboxylic acids.

I DISCUSSION OF METHOD OF SYNTHESIS OF THE HERBICIDES

Below are presented suggested procedures for synthesis of the epithiopropyl N,N-dialkyl-thilcarbamates, as well as illustrative procedures for preparation of the herbicides of this invention by reaction with active halogen compounds.

The 2,3- epithiopropyl N,N-dialkyl-thiolcarbamates may be prepared by two general methods, one a three-step process, with isolation of intermediates and the other essentially a single-step process, as illustrated below:

METHOD A

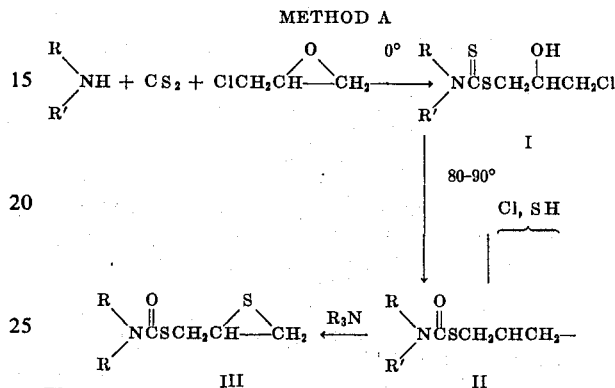

The initial low-temperature reaction is believed to include reaction of epichlorohydrin with N,N-dialkyldithiocarbamic acid.

METHOD B

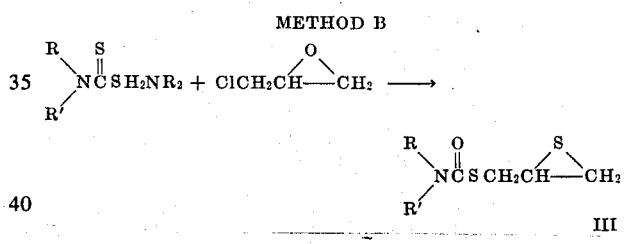

The reaction of epichlorohydrin with a salt (which may also be a metal salt, as well as an amine salt) appears to require a higher temperature than reaction with the acid.

In an experiment in which both routes were used to prepare the same N,N-diethyl thiolcarbamate compound, the yields were roughly equivalent. In syntheses based on morpholine, dicyclohexylamine or isopropyl cyclohexylamine as starting materials, Method B has been found to be the only successful route, with the dithiocarbamate salt being the sole product obtained in the first step of method A, rather than the more reactive free acid.

Intermediates (I) and (II) are capable of isolation but are not easily purified. Compound (I) is thermally unstable, rearranging to (II) in a matter of several hours to several days, depending on the nature of the N substituents. The structure of (I) is thought to be as shown, based on its infrared spectrum and the NMR spectrum of its phenylurethane derivative. Intermediate compounds (II) are relatively stable and suitable for use in manufacturing the herbicides of this invention, although use of the more stable epithiopropyl compounds (III) is preferred. Present evidence favors the structure of II shown in the reaction diagram below, which shows schematically the treatment with acetyl chloride of both compounds (II) and (III) to give compounds of type (IV).

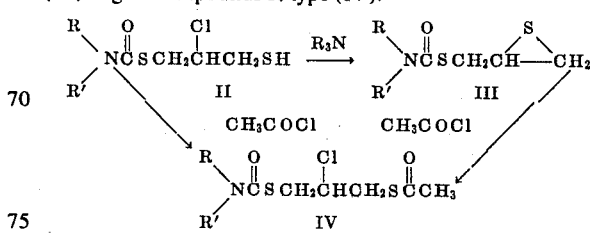

The success of the sequence of reactions leading to an epithiopropyl thiolcarbamate apparently requires a secondary amine as starting material. In three instances in which a primary amine was used the crude products decomposed extensively and no epithiopropyl thiolcarbamate (III), was obtained. In one experiment, starting with tert.-butyl amine, tert.-butyl isothiocyanate was found among the products of decomposition.

The epithiopropyl thiocarbamate products (III) of the sequence are distillable liquids or crystalline solids. Some care must be exercised to prevent excessive heating during distillation. Otherwise the following decomposition readily occurs:

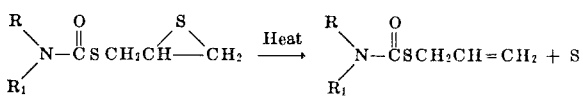

The 3-substituted-2-halopropyl thiolcarbamates as illustrated by (IV) above are generally liquids at room temperature and are stable in storage, but resemble compounds of type (III) in sensitivity to heating.

II ILLUSTRATIVE PROCEDURES

Method A

To a well-stirred mixture of 38.0 g. (0.5 mol) of carbon disulfide and 46.3 g. (0.5 mol) of epichlorohydrin in an ice-salt bath is added 36.5 g. (0.5 mol) of anhydrous diethylamine during 1–2 hours at 0 to −5° C. The mixture is stirred an additional 30 minutes, then let warm slowly to room temperature. At this point the reaction mixture is essentially 3-chloro-2-hydroxypropyl N,N-diethyldithiocarbamate, (I; R,R′=Et), a viscous yellow oil with no detectable unreacted starting materials present.

Heating of the reaction mixture for 2 hours at 80–90 under vacuum gives 110 g. of crude rearrangement product II (R,R′=Et). the course of the rearrangement may be easily followed by the disappearance of infrared absorption bands at 2.95 μ (OH) and 10.15 μ (C = S) and with the appearance of bands at 3.92 μ (SH) and 6.0 μ (C = O). The rearrangement is also accompanied by a marked decrease in viscosity.

To 29 g. (0.12 mole of the crude rearranged product in 100 ml. of ether is added slowly 12 g. (0.12 ) mols of triethylamine. Reaction is immediate, causing the ether to reflux gently and precipitating 10.8 g. of triethylamine hydrochloride. The solution is filtered, evaporated and vacuum distilled, giving 15.1 g. (61.4 percent yield overall) of 2,3-epithiopropyl N,N-diethylthiolcarbamate (III; R,R′=Et), b.p.0.2 mm.119–20°.

Method B

A solution of 36 g. (0.173 mol) of diethylammonium diethyldithiocarbamate and 15.0 g. (0.162 mols) of epichlorohydrin in 100 ml. of dioxane is heated to reflux. Shortly after heating is begun, a crystalline precipitate appears. After 2 hours, the solution is cooled and filtered to recover 15.4 g. of diethylamine hydrochloride. The filtrate is vacuum distilled to remove the bulk of the solvent, leaving 33.2 g. of a viscous brown oil. Extraction of this oil with ether, decantation and evaporation of the ether gives 25.7 g. of residue, distillation of which gives 17.7 g. of a compound of type (III) in which R and R′ are ethyl.

The procedures illustrated may be used with various secondary amines or dithiocarbamates as starting materials to produce the desired epithiopropyl thiocarbamates, method A being generally more desirable because it employs cheaper raw materials and generally gives good yields. Below are presented illustrative examples of syntheses of 3-organothio-2-halopropyl N,N-di-substituted thiolcarbamates of this invention.

Preparation of 3-acetylthio-2-chloropropyl N,N-diethyl thiolcarbamate

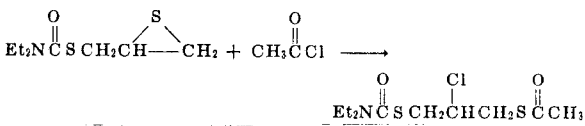

A mixture of 16.4 g. (0.08 mole) of 2,3-epithiopropyl N,N-diethylthiolcarbamate and 6.3 g. (0.08 mole) of acetyl chloride is heated 5.5 hours on the steam bath under reflux and then distilled at reduced pressure. Following a short forerun, there is obtained 3.4 g. of an intermediate cut, b.p. 133–140°C. at 0.07 mm. and 10.8 g. of 3-acetylthio-2-chloropropyl N,N-diethylthiolcarbamate, b.p. 140–5° C. at 0.05 mm. N26 D 1.5302.

Preparation of 3-cyclopropanecarbonylthio-2-chloropropyl N,N-diethylthiolcarbamate

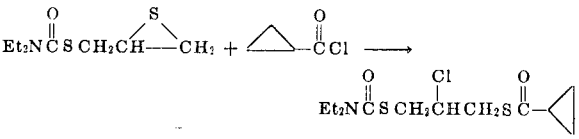

A mixture of 10.3 g. (0.05 mole) of 2,3-epithiopropyl N,N-diethylthiolcarbamate and 5.2 g. (0.05 mole) of cyclopropanecarbonyl chloride is heated 20 hours on the steam bath and then vacuum stripped at 120° C. pot temperature and 0.1 mm. pressure giving as the residual oil, 14.2 g. of 3-cyclopropanecarbonylthio-2-chloropropyl N,N-diethylthiolcarbamate, N26 D 1.5378.

Preparation of 3-Thiocyano-2-bromopropyl N,N-Dipropylthiolcarbamate

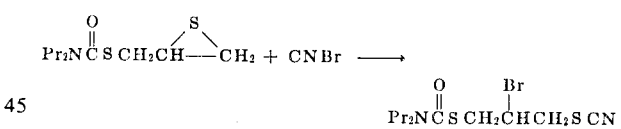

A mixture of 9.3 g. (0.04 mols) of 2,3-epithiopropyl N,N-dipropylthiolcarbamate and 4.2 g. (0.04 mols) of cyanogen bromide is heated 4 hours on the steam bath and then dissolved in 100 ml. of benzene. Addition of 200 ml. of hexane precipitates a small amount of gummy solid. Filtration of the benzene-hexane solution and evaporation at reduced pressure leaves 11.4 g. of viscous residual oil, shown by its NMR spectrum to be primarily 3-thiocyano-2-bromopropyl N,N-dipropylthiolcarbamate.

Preparation of 3-methoxymethylthio-2-chloropropyl N,N-dipropylthiolcarbamate

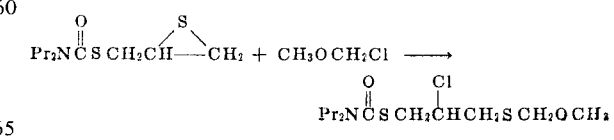

A mixture of 23.3 g. (0.1 mol) of 2,3-epithiopropyl N,N-dipropylthiolcarbamate and 8.1 g. (0.1 mol) of chloromethyl methyl ether is heated 2 hours at 60°under a reflux condenser and then vacuum stripped at 100° pot temperature and 0.1 mm. pressure to give 30.5 g. of 3-methoxymethylthio-2-chloropropyl N,N-dipropylthiolcarbamate.

Tabulated below are chemical and physical properties of specific products obtained by the procedures discussed and illustrated above.

TABLE 1.—PROPERTIES OF PRODUCTS OF FORMULA RR'N—COS—CH$_2$—CXH—CH$_2$—S—Y

| Compound No. | R and R' | X—Y | N$_D$/° C. or (B.P./mm.) | Calculated C | Calculated H | Calculated N | Calculated X | Found C | Found H | Found N | Found X |
|---|---|---|---|---|---|---|---|---|---|---|---|
| 1 | nC$_3$H$_7$ | Cl—C(O)—CHCl$_2$ | 1.5359/27 | 37.84 | 5.29 | 3.68 | 27.93 | 38.45 | 5.50 | 3.72 | 26.58 |
| 2 | nC$_3$H$_7$ | Cl—C(O)—CH$_2$Cl | (185–93°/0.8) | 41.61 | 6.12 | 4.04 | 20.47 | 42.10 | 6.41 | 4.39 | 18.96 |
| 3 | nC$_3$H$_7$ | Cl—C(O)—CCl$_3$ | 1.5338/23 | 34.71 | 4.61 | 3.38 | 34.16 | 35.77 | 4.55 | 3.42 | 33.48 |
| 4 | nC$_3$H$_7$ | Cl—C(O)—cyclopropyl | 1.5258/27 | 49.76 | 7.16 | 4.15 | 10.49 | 49.45 | 6.74 | 4.28 | 10.50 |
| 5 | nC$_3$H$_7$ | Cl—C(O)—t-C$_4$H$_9$ | 1.5126/27 | 50.90 | 7.97 | 3.96 | 10.02 | 51.07 | 7.62 | 3.53 | 8.78 |
| 6 | nC$_3$H$_7$ | Cl—C(O)—CH$_2$C(CH$_3$)$_3$ | 1.5131/25 | 52.22 | 8.22 | 3.81 | 9.64 | 52.17 | 8.14 | 3.98 | 10.35 |
| 7 | nC$_3$H$_7$ | Cl—C(O)—iso—C$_3$H$_7$ | 1.5153/24 | 49.46 | 7.71 | 4.12 | 10.43 | 49.55 | 7.90 | 3.63 | 9.35 |
| 8 | nC$_3$H$_7$ | Cl—C(O)—CH$_2$—CH$_2$Cl | 1.5330/27 | 43.33 | 6.43 | 3.89 | 19.68 | 45.50 | 6.40 | 3.45 | 15.30 |
| 9 | nC$_3$H$_7$ | Cl—C(O)—CH$_2$CH$_2$C(O)OCH$_3$ | 1.5171/27 | 46.92 | 6.83 | 3.65 | 9.23 | 48.48 | 6.40 | 3.60 | 8.23 |
| 10 | nC$_3$H$_7$ | Cl—C(O)—CH$_2$OCH$_3$ | 1.5224/25 | 45.66 | 7.08 | 4.10 | 10.37 | 46.10 | 7.23 | 4.01 | 10.08 |
| 11 | nC$_3$H$_7$ | Br—C(O)—CH$_2$Br | 1.5590/25 | 33.11 | 4.86 | 3.22 | 36.72 | 33.97 | 5.25 | 3.39 | 37.00 |
| 12 | nC$_3$H$_7$ | Cl—C(O)—4—ClC$_6$H$_5$ | 1.5727/27 | 49.99 | 5.68 | 3.43 | 17.36 | 48.44 | 5.40 | 3.50 | 16.91 |
| 13 | nC$_3$H$_7$ | Cl—C(O)—OCH$_2$CH$_2$Cl | 1.5301/27 | 41.48 | 6.16 | 3.72 | 18.84 | 44.28 | 6.97 | 4.25 | 14.85 |
| 14 | nC$_3$H$_7$ | Cl—C(O)—SCH$_2$CH$_2$ | 1.5358/27 | 43.61 | 6.76 | 3.91 | 9.91 | 44.46 | 7.50 | 4.46 | 11.31 |
| 15 | nC$_3$H$_7$ | Cl—C(O)—N(C$_2$H$_5$)$_2$ | 1.5032/27 | 48.82 | 7.92 | 7.59 | 9.61 | 49.28 | 8.23 | 6.55 | 10.60 |
| 16 | nC$_3$H$_7$ | Cl—C(O)—C(O)OC$_2$H$_5$ | 1.5195/25 | 45.58 | 6.28 | 3.80 | 9.61 | 47.11 | 6.69 | 3.77 | 9.40 |
| 17 | isoC$_3$H$_7$ | Cl—C(O)—CH$_3$ | (145–9°/0.07) | 46.20 | 7.06 | 4.49 | 11.41 | 46.10 | 7.19 | 3.97 | 11.08 |
| 18 | isoC$_3$H$_7$ | Cl—C(O)—cyclopropyl | 1.5296/26 | 49.96 | 7.16 | 4.15 | 10.49 | 49.89 | 6.93 | 4.05 | 10.82 |
| 19 | isoC$_3$H$_7$ | Cl—C(O)—C$_6$H$_4$—NO$_2$ | -------- | 48.70 | 5.49 | 6.68 | 8.47 | 48.73 | 5.94 | 6.77 | 8.78 |
| 20 | C$_2$H$_5$ | Cl—C(O)—CH$_3$ | (140–5°/0.05) | 42.30 | 6.35 | 4.93 | 12.51 | 42.70 | 6.57 | 4.84 | 12.49 |
| 21 | C$_2$H$_5$ | Cl—C(O)—cyclopropyl | 1.5378/26 | 46.51 | 6.51 | 4.52 | 11.44 | 46.47 | 6.46 | 4.43 | 11.25 |
| 22 | nC$_3$H$_7$ | Cl—C(O)—CH$_3$ | 1.5203/24 | 46.20 | 7.06 | 4.49 | -------- | 46.91 | 7.22 | 4.75 | -------- |
| 23 | nC$_3$H$_7$ | Cl—C(O)—(2,6-dichloro-3-methoxyphenyl) | 1.5590/24 | 46.72 | 5.12 | 2.96 | -------- | 46.30 | 5.00 | 3.35 | -------- |
| 24 | nC$_3$H$_7$ | Cl—C(O)—CH$_2$O—(2,4-dichlorophenyl) | 1.5660/23 | 45.72 | 5.12 | 2.96 | 22.49 | 45.94 | 5.19 | 2.91 | 21.81 |

| Compound No. | R and R' | X—Y | $N_D/°C$ or (B.P./mm.) | Calculated C | H | N | X | Found C | H | N | X |
|---|---|---|---|---|---|---|---|---|---|---|---|
| 25 | n-C₃H₇ | Cl—C(=O)—C₆H₂Cl₃ (2,3,5-trichlorophenyl) | 1.5660/24 | 49.41 | 5.12 | 3.39 | 34.33 | 43.80 | 43.0 | 3.28 | 31.25 |
| 26 | n-C₃H₇ | Cl—C(=O)—C₂H₅ | 1.5176/25 | 47.90 | 7.42 | 4.30 | 10.88 | 48.18 | 7.69 | 4.27 | 10.53 |
| 27 | n-C₃H₇ | Cl—C(=O)—n-C₄H₉ | 1.5108/25 | 50.90 | 79.7 | 3.96 | 10.02 | 46.18 | 8.25 | 3.71 | 9.35 |
| 28 | n-C₃H₇ | Cl—C(=O)—n-C₃H₇ | 1.5151/25 | 49.46 | 7.71 | 4.12 | 10.43 | 49.37 | 7.99 | 4.04 | 10.49 |
| 29 | n-C₃H₇ | Cl—C(=O)—n-C₇H₁₅ | 1.5016/24 | 54.58 | 8.65 | 3.54 | 8.95 | 56.79 | 8.85 | 3.68 | 8.89 |
| 30 | n-C₃H₇ | Cl—C(=O)—CHCH₃ \| Cl | 1.5212/24 | 43.33 | 6.43 | 3.89 | 19.68 | 43.35 | 6.67 | 4.06 | 19.99 |
| 31 | n-C₃H₇ | Cl—C(=O)—isoC₄H₉ | 1.5132/25 | 50.90 | 7.97 | 3.96 | 10.02 | 51.23 | 8.38 | 3.88 | 10.24 |
| 32 | isoC₃H₇ | Cl—C(=O)—C₂H₅ | 1.5192/25 | 47.90 | 7.42 | 4.30 | 10.88 | 49.56 | 7.43 | 3.84 | 8.95 |
| 33 | isoC₃H₇ | Cl—C(=O)—n-C₃H₇ | 1.5152/25 | 49.46 | 7.71 | 4.12 | 10.43 | 49.46 | 8.19 | 4.24 | 10 16 |
| 34 | isoC₃H₇ | Cl—C(=O)—isoC₃H₇ | 1.5100/25 | 49.46 | 7.71 | 4.12 | 10.43 | 49.95 | 7.95 | 3.97 | 9.85 |
| 35 | isoC₃H₇ | Cl—C(=O)—t-C₄H₉ | 1.5116/25 | 50.90 | 7.97 | 3.96 | 10.02 | 50.72 | 7.85 | 4.29 | 10.82 |
| 36 | isoC₃H₇ | Cl—C(=O)—n-C₄H₉ | 1.5131/25 | 50.90 | 7.97 | 3.96 | 10.02 | 51.19 | 8.08 | 4.19 | 10.20 |
| 37 | isoC₃H₇ | Cl—C(=O)—isoC₄H₉ | 1.5493/25 | 50.90 | 7.97 | 3.96 | 10.02 | 51.18 | 8.18 | 4.05 | 10.39 |
| 38 | isoC₃H₇ | Cl—C(=O)—OCH₂CH₂Cl | 1.5213/25 | 41.48 | 6.16 | 3.72 | 18.84 | 43.95 | 6.70 | 5.35 | 14.42 |
| 39 | isoC₃H₇ | Cl—C(=O)—CH₂OCH₃ | 1.5215/25 | 45.66 | 7.08 | 4.10 | 10.37 | 47.88 | 7.39 | 4.09 | 9.69 |
| 40 | isoC₃H₇ | Cl—C(=O)—C(=O)OC₂H₅ | 1.5129/25 | 45.58 | 6.28 | 3.80 | 9.61 | 45.63 | 6.80 | 4.05 | 10.03 |
| 41 | isoC₃H₇ | Cl—C(=O)—SC₂H₅ | 1.5257/25 | 43.61 | 6.76 | 3.91 | 9.91 | 47.69 | 7.45 | 3.80 | 9.84 |
| 42 | isoC₃H₇ | Cl—C(=O)—CCl₃ | 1.5365/25 | 34.71 | 4.61 | 3.38 | 34.16 | 36.31 | 5.09 | 3.44 | 32.20 |
| 43 | isoC₃H₇ | Cl—C(=O)—CH₂C(CH₃)₃ | 1.5006/25 | 52.22 | 8.22 | 3.81 | 9.64 | 52.55 | 8.10 | 3.84 | 9.75 |
| 44 | n-C₃H₇ | Cl—C(=O)—CF₂Cl | 1.4959/26 | 41.55 | 5.52 | 4.04 | 21.18 | 38.52 | 5.08 | 5.40 | 19.55 |
| 45 | n-C₃H₇ | Cl—CH₂OCH₃ | .......... | 46.06 | 7.41 | 4.48 | 11.33 | 46.31 | 7.04 | 4.66 | 10.95 |
| 46 | n-C₃H₇ | Br—CN | .......... | 38.93 | 5.64 | 8.26 | 23.55 | 42.26 | 6.55 | 6.55 | 19.05 |
| 47 | n-C₃H₇ | Cl—SO₂CH₃ | 1.5398/24 | 38.01 | 6.33 | 4.03 | 10.21 | 45.40 | 7.43 | 5.77 | 8.10 |
| 48 | n-C₃H₇ | Cl—SO₂n-C₃H₇ | 1.5276/26 | 41.52 | 6.97 | 3.72 | 9.43 | 41.74 | 7.14 | 3.81 | 8.53 |
| 49 | n-C₃H₇ | Cl—CH₂C(=O)CH₃ | 1.5245/26 | 47.91 | 7.42 | 4.30 | 10.88 | 48.40 | 7.47 | 4.24 | 10.73 |
| 50 | n-C₃H₇ | Br—CH₂C≡CH | 1.5452/27 | 44.30 | 6.29 | 3.85 | 22.67 | 46.06 | 6.93 | 3.88 | 18.20 |
| 51 | n-C₃H₇ | Cl—CH₂SCH₃ | 1.5385/26 | 52.29 | 8.71 | 5.08 | 12.86 | 46.33 | 7.73 | 11.05 | 7.30 |
| 52 | n-C₃H₇ | Cl—P(=O)(OEt)₂ | 1.5229/26 | 41.42 | 7.20 | 3.45 | 8.73 | 46.68 | 7.89 | 6.95 | 8.72 |
| 53 | n-C₃H₇ | Cl—P(=S)(OEt)₂ | 1.5130/26 | 39.84 | 6.93 | 3.32 | 7.34 | 42.32 | 7.61 | 4.59 | 7.68 |
| 54 | n-C₃H₇ | Br—CH₂C(=O)C(CH₃)₃ | 1.5183/27 | 46.59 | 7.33 | 3.39 | .......... | 45.61 | 7.00 | 3.56 | .......... |

III. HERBICIDAL USE

A. Post Emergent Activity

An aqueous dispersion of each active compound was prepared by combining 0.4 gram of the compound with about 4 ml. of a solvent-emulsifier mixture (3 parts of a commercial polyoxyethylated vegetable oil emulsifier, one part xylene, one part kerosene) and then adding water, with stirring, to a final volume of 40 ml.

The species of plants on which each compound was to be tested were planted in 4-inch pots in a greenhouse. Ten to 18 days after emergence of the plants, three pots were sprayed with an aqueous dispersion of the active compound prepared as described above, at a rate of 5 lb. of active compound per acre and at a spray volume of 60 gallons per acre. Approximately 1 week after the spray application the plants were observed and the results rated according to the following schedule:

Herbicidal Effect
0 = no effect
1 = slight effect
2 = moderate effect
3 = severe effect
4 = maximum effect
(all plants died)

The same rating schedule was employed to judge pre-emergent results obtained according to the procedure below.

B. Pre-emergent Activity

A solution of each active compound was prepared by dissolving 290 mg. of the compound to be tested in 200 ml. of acetone. Disposable paper half-flats (molded pulp trays about 2 to 3 inches deep and half the size of ordinary greenhouse flats) were prepared and seeded with a variety of species of plant seeds, then sprayed with the acetone solution at the rate of 10 lb. of active chemical per acre of sprayed area. One flat, which has been seeded with alfalfa, brome, flax, oats, radishes and sugar beets were held at 75° F. day temperature; another seeded with corn, coxcomb, cotton, crab grass, millet and soybeans was held at 85° F. Twenty-one days after seeding and treatment the flats were examined and herbicidal effect was rated according to the above schedule.

Both post-emergent and pre-emergent results are set forth in the following table.

TABLE 2.—PRE- AND POST-EMERGENT HERBICIDAL ACTIVITY

| Compound No. | Type | Crab-grass | Cox-comb | Brome | Millet | Soy-bean | Cot-ton | Alfalfa | Oats | Corn | Flax | Radish | Sugar beet | Wheat | Grain Sorghum | Tomato |
|---|---|---|---|---|---|---|---|---|---|---|---|---|---|---|---|---|
| 1 | Pre | 2 | 0 | 4 | 1 | 0 | 0 | 0 | 3 | 0 | 0 | 0 | 0 | | | |
|   | Post | | | | 0 | 2 | 0 | 0 | 0 | 1 | 0 | 0 | 0 | 0 | 0 | 0 |
| 2 | Pre | 1 | 0 | 4 | 2 | 1 | 1 | 0 | 2 | 0 | 0 | 0 | 1 | | | |
|   | Post | | | | 1 | 0 | 1 | 0 | 0 | 0 | 1 | 1 | 1 | 0 | 0 | 1 |
| 3 | Pre | 3 | 2 | 4 | 4 | 2 | 1 | 1 | 4 | 0 | 1 | 3 | 1 | | | |
|   | Post | | | | 0 | 0 | 0 | 0 | 0 | 0 | 0 | 0 | 0 | 0 | 1 | 0 |
| 4 | Pre | 4 | 4 | 4 | 2 | 1 | 2 | 0 | 4 | 0 | 0 | 0 | 0 | | | |
|   | Post | | | | 0 | 0 | 0 | 0 | 0 | 0 | 0 | 0 | 0 | 0 | 0 | 0 |
| 5 | Pre | 2 | 0 | 4 | 2 | 0 | 0 | 0 | 3 | 0 | 0 | 0 | 0 | | | |
|   | Post | | | | 0 | 0 | 0 | 0 | 0 | 0 | 0 | 0 | 0 | 0 | 0 | 0 |
| 6 | Pre | 3 | 4 | 4 | 3 | 0 | 0 | 1 | 3 | 0 | 0 | 0 | 0 | | | |
|   | Post | | | | 0 | 0 | 0 | 0 | 0 | 0 | 0 | 0 | 0 | 0 | 0 | 0 |
| 7 | Pre | 3 | 0 | 4 | 3 | 1 | 1 | 1 | 4 | 0 | 0 | 1 | 0 | | | |
|   | Post | | | | 0 | 0 | 0 | 0 | 0 | 0 | 0 | 0 | 0 | 0 | 0 | 0 |
| 8 | Pre | 2 | 0 | 4 | 2 | 0 | 0 | 0 | 3 | 0 | 0 | 0 | 0 | | | |
|   | Post | | | | 0 | 0 | 0 | 0 | 0 | 0 | 1 | 0 | 1 | 0 | 0 | 0 |
| 9 | Pre | 2 | 0 | 4 | 2 | 0 | 0 | 0 | 3 | 0 | 0 | 0 | 0 | | | |
|   | Post | | | | 0 | 0 | 0 | 0 | 0 | 0 | 0 | 0 | 0 | 0 | 0 | 0 |
| 10 | Pre | 3 | 0 | 4 | 2 | 0 | 0 | 0 | 3 | 0 | 0 | 0 | 0 | | | |
|    | Post | | | | 0 | 0 | 0 | 0 | 0 | 0 | 0 | 0 | 0 | 0 | 0 | 0 |
| 11 | Pre | 0 | 0 | 4 | 1 | 0 | 0 | 0 | 1 | 0 | 0 | 0 | 0 | | | |
|    | Post | | | | 0 | 0 | 1 | 0 | 0 | 0 | 1 | 0 | 2 | 0 | 0 | 0 |
| 12 | Pre | 2 | 0 | 4 | 2 | 0 | 0 | 0 | 3 | 0 | 0 | 0 | 0 | | | |
|    | Post | | | | 0 | 0 | 0 | 0 | 0 | 0 | 0 | 0 | 0 | 0 | 0 | 0 |
| 13 | Pre | 2 | 0 | 4 | 2 | 0 | 0 | 0 | 3 | 0 | 0 | 0 | 0 | | | |
|    | Post | | | | 0 | 0 | 0 | 0 | 0 | 0 | 0 | 0 | 0 | 0 | 0 | 0 |
| 14 | Pre | 1 | 0 | 4 | 2 | 0 | 0 | 0 | 1 | 0 | 0 | 0 | 0 | | | |
|    | Post | | | | 0 | 0 | 0 | 0 | 0 | 0 | 0 | 0 | 0 | 0 | 0 | 0 |
| 15 | Pre | 2 | 0 | 1 | 1 | 0 | 0 | 0 | 0 | 0 | 0 | 0 | 0 | | | |
|    | Post | | | | 0 | 0 | 0 | 1 | 0 | 1 | 3 | 2 | 2 | 0 | 0 | 2 |
| 16 | Pre | 3 | 0 | 4 | 1 | 0 | 0 | 1 | 3 | 0 | 0 | 0 | 0 | | | |
|    | Post | | | | 0 | 0 | 0 | 0 | 0 | 0 | 0 | 0 | 0 | 0 | 0 | 0 |
| 17 | Pre | 0 | 0 | 4 | 1 | 0 | 0 | 0 | 3 | 0 | 0 | 0 | 0 | | | |
|    | Post | | | | 0 | 0 | 0 | 0 | 0 | 0 | 0 | 0 | 0 | 0 | 0 | 0 |
| 18 | Pre | 1 | 3 | 4 | 1 | 0 | 0 | 0 | 4 | 0 | 1 | 1 | 1 | | | |
|    | Post | | | | 0 | 0 | 0 | 0 | 0 | 0 | 0 | 0 | 0 | 0 | 0 | 0 |
| 19 | Pre | 0 | 0 | 4 | 2 | 1 | 0 | 0 | 3 | 0 | 0 | 0 | 0 | | | |
|    | Post | | | | 0 | 0 | 0 | 0 | 0 | 0 | 0 | 0 | 0 | 0 | 0 | 0 |
| 20 | Pre | 1 | 0 | 2 | 1 | 0 | 0 | 0 | 2 | 0 | 0 | 0 | 0 | | | |
|    | Post | | | | 0 | 0 | 0 | 0 | 0 | 0 | 0 | 0 | 0 | 0 | 0 | 0 |
| 21 | Pre | 1 | 2 | 4 | 2 | 1 | 3 | 0 | 2 | 0 | 0 | 0 | 1 | | | |
|    | Post | | | | 1 | 0 | 1 | 0 | 0 | 0 | 0 | 0 | 1 | 0 | 0 | 0 |
| 22 | Pre | 3 | 1 | 4 | 3 | 1 | 1 | 1 | 4 | 0 | 0 | 0 | 0 | | | |
|    | Post | | | | 0 | 0 | 0 | 0 | 0 | 0 | 0 | 0 | 0 | 0 | 0 | 0 |
| 23 | Pre | 4 | 4 | 4 | 4 | 4 | 4 | 4 | 4 | 3 | 4 | 4 | 4 | | | |
|    | Post | | | | 2 | 4 | 4 | 4 | 1 | 2 | 4 | 4 | 4 | 1 | 1 | 4 |
| 24 | Pre | 4 | 4 | 4 | 4 | 4 | 4 | 4 | 3 | 3 | 4 | 4 | 4 | | | |
|    | Post | | | | 3 | 4 | 4 | 4 | 3 | 3 | 4 | 4 | 4 | 2 | 2 | 4 |
| 25 | Pre | 4 | 4 | 4 | 3 | 4 | 4 | 4 | 4 | 3 | 4 | 4 | 4 | | | |
|    | Post | | | | 0 | 3 | 3 | 2 | 2 | 0 | 3 | 1 | 3 | 0 | 0 | 4 |
| 26 | Pre | 4 | 1 | 4 | 2 | 2 | 0 | 0 | 4 | 0 | 0 | 0 | 0 | | | |
|    | Post | | | | 0 | 0 | 0 | 0 | 0 | 0 | 0 | 0 | 0 | 0 | 0 | 0 |
| 27 | Pre | 3 | 1 | 4 | 2 | 1 | 1 | 0 | 4 | 0 | 0 | 0 | 0 | | | |
|    | Post | | | | 0 | 0 | 0 | 0 | 0 | 0 | 0 | 0 | 0 | 0 | 0 | 0 |
| 28 | Pre | 3 | 1 | 4 | 2 | 1 | 0 | 0 | 4 | 0 | 1 | 1 | 1 | | | |
|    | Post | | | | 0 | 0 | 0 | 0 | 0 | 0 | 0 | 0 | 0 | 0 | 0 | 0 |
| 29 | Pre | 3 | 1 | 4 | 3 | 0 | 0 | 0 | 4 | 0 | 0 | 0 | 0 | | | |
|    | Post | | | | 0 | 0 | 0 | 0 | 0 | 0 | 0 | 0 | 0 | 0 | 0 | 0 |
| 30 | Pre | 3 | 1 | 4 | 3 | 1 | 0 | 0 | 4 | 0 | 0 | 0 | 0 | | | |
|    | Post | | | | 0 | 0 | 0 | 0 | 0 | 0 | 0 | 0 | 0 | 0 | 0 | 0 |
| 31 | Pre | 3 | 1 | 4 | 3 | 0 | 0 | 0 | 4 | 0 | 1 | 0 | 0 | | | |
|    | Post | | | | 0 | 0 | 0 | 0 | 0 | 0 | 0 | 0 | 0 | 0 | 0 | 0 |
| 32 | Pre | 2 | 0 | 3 | 2 | 1 | 0 | 0 | 3 | 0 | 0 | 0 | 0 | | | |
|    | Post | | | | 0 | 0 | 0 | 0 | 0 | 0 | 0 | 0 | 0 | 0 | 0 | 0 |
| 33 | Pre | 3 | 1 | 4 | 2 | 1 | 0 | 0 | 4 | 0 | 0 | 0 | 1 | | | |
|    | Post | | | | 0 | 0 | 0 | 0 | 0 | 0 | 0 | 0 | 0 | 0 | 0 | 0 |
| 34 | Pre | 2 | 1 | 4 | 2 | 1 | 0 | 0 | 3 | 0 | 0 | 0 | 0 | | | |
|    | Post | | | | 0 | 0 | 0 | 0 | 0 | 0 | 0 | 0 | 0 | 0 | 0 | 0 |
| 35 | Pre | 1 | 0 | 4 | 2 | 1 | 0 | 0 | 4 | 0 | 0 | 0 | 0 | | | |
|    | Post | | | | 0 | 0 | 0 | 0 | 0 | 0 | 0 | 0 | 0 | 0 | 0 | 0 |
| 36 | Pre | 1 | 1 | 4 | 1 | 2 | 0 | 1 | 4 | 0 | 0 | 0 | 0 | | | |
|    | Post | | | | 0 | 0 | 0 | 0 | 0 | 0 | 0 | 0 | 0 | 0 | 0 | 0 |

| Compound No. | Type | Crab-grass | Cox-comb | Brome | Millet | Soy-bean | Cot-ton | Alfalfa | Oats | Corn | Flax | Radish | Sugar beet | Wheat | Grain sor-ghum | Tomato |
|---|---|---|---|---|---|---|---|---|---|---|---|---|---|---|---|---|
| 37 | Pre | 1 | 1 | 4 | 2 | 1 | 0 | 0 | 4 | 0 | 0 | 0 | 1 | | | |
|    | Post | | | | 0 | 0 | 0 | 0 | 0 | 0 | 0 | 0 | 0 | 0 | 0 | 0 |
| 38 | Pre | 1 | 1 | 4 | 2 | 2 | 1 | 1 | 4 | 1 | 2 | 1 | 1 | | | |
|    | Post | | | | 0 | 0 | 0 | 0 | 0 | 0 | 0 | 0 | 0 | 0 | 0 | 0 |
| 39 | Pre | 1 | 0 | 4 | 2 | 1 | 0 | 0 | 3 | 0 | 0 | 0 | 0 | | | |
|    | Post | | | | 0 | 0 | 0 | 0 | 0 | 0 | 0 | 0 | 0 | 0 | 0 | 0 |
| 40 | Pre | 1 | 2 | 4 | 2 | 2 | 1 | 0 | 4 | 0 | 0 | 1 | 0 | | | |
|    | Post | | | | 0 | 0 | 0 | 0 | 0 | 0 | 0 | 0 | 0 | 0 | 0 | 0 |
| 41 | Pre | 1 | 0 | 4 | 3 | 1 | 0 | 0 | 4 | 0 | 0 | 0 | 0 | | | |
|    | Post | | | | 0 | 0 | 0 | 0 | 0 | 0 | 0 | 0 | 0 | 0 | 0 | 0 |
| 42 | Pre | 4 | 3 | 4 | 3 | 3 | 1 | 2 | 4 | 3 | 2 | 2 | 2 | | | |
|    | Post | | | | 0 | 0 | 0 | 0 | 0 | 0 | 0 | 0 | 0 | 0 | 0 | 0 |
| 43 | Pre | 1 | 0 | 4 | 3 | 0 | 0 | 2 | 4 | 0 | 0 | 0 | 0 | | | |
|    | Post | | | | 1 | 1 | 0 | 0 | 2 | 0 | 0 | 0 | 0 | 0 | 0 | 1 |
| 44 | Pre | 3 | 1 | 4 | 3 | 2 | 2 | 2 | 4 | 3 | 1 | 1 | 1 | | | |
|    | Post | | | | 2 | 2 | 1 | 1 | 0 | 1 | 1 | 1 | 1 | 0 | 0 | 1 |
| 45 | Pre | 3 | 0 | 4 | 4 | 0 | 0 | 0 | 3 | 0 | 0 | 0 | 0 | | | |
|    | Post | | | | 0 | 0 | 0 | 0 | 0 | 0 | 0 | 0 | 0 | 0 | 0 | 0 |
| 46 | Pre | 3 | 0 | 4 | 3 | 1 | 0 | 0 | 4 | 0 | 0 | 0 | 0 | | | |
|    | Post | | | | 0 | 0 | 0 | 0 | 0 | 0 | 0 | 0 | 0 | 0 | 0 | 0 |
| 47 | Pre | 1 | 0 | 4 | 3 | 1 | 0 | 0 | 4 | 0 | 0 | 0 | 0 | | | |
|    | Post | | | | 0 | 0 | 0 | 0 | 0 | 0 | 0 | 0 | 0 | 0 | 0 | 0 |
| 48 | Pre | 0 | 0 | 2 | 1 | 0 | 0 | 0 | 0 | 0 | 0 | 0 | 0 | | | |
|    | Post | | | | 0 | 0 | 0 | 0 | 0 | 0 | 0 | 0 | 0 | 0 | 0 | 0 |
| 49 | Pre | 1 | 0 | 4 | 3 | 0 | 0 | 0 | 4 | 0 | 1 | 0 | 0 | | | |
|    | Post | | | | 0 | 0 | 0 | 0 | 0 | 0 | 0 | 0 | 0 | 0 | 0 | 0 |
| 50 | Pre | 2 | 0 | 4 | 3 | 2 | 2 | 1 | 4 | 1 | 1 | 1 | 0 | | | |
|    | Post | | | | 0 | 0 | 0 | 0 | 0 | 0 | 0 | 0 | 0 | 0 | 0 | 0 |
| 51 | Pre | 1 | 0 | 4 | 2 | 1 | 0 | 0 | 4 | 0 | 1 | 0 | 1 | | | |
|    | Post | | | | 1 | 0 | 0 | 0 | 0 | 0 | 0 | 0 | 0 | 0 | 0 | 0 |
| 52 | Pre | 1 | 0 | 4 | 2 | 0 | 0 | 0 | 3 | 0 | 0 | 0 | 0 | | | |
|    | Post | | | | 0 | 0 | 0 | 0 | 0 | 0 | 0 | 0 | 0 | 0 | 0 | 0 |
| 53 | Pre | 2 | 0 | 4 | 2 | 1 | 0 | 1 | 4 | 0 | 1 | 0 | 1 | | | |
|    | Post | | | | 0 | 0 | 0 | 0 | 0 | 0 | 0 | 0 | 0 | 0 | 0 | 0 |
| 54 | Pre | 1 | 0 | 4 | 3 | 0 | 0 | 0 | 3 | 1 | 0 | 1 | 0 | | | |
|    | Post | | | | 0 | 0 | 0 | 0 | 0 | 0 | 0 | 0 | 0 | 0 | 0 | 0 |

I claim:

1. The method of combating undesired vegetation which comprises applying to the locus of the seeds of the undesired vegetation an effective amount of a compound represented by the structural formula

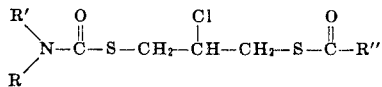

in which R and R' are propyl or isopropyl substituents and R'' is selected from the group consisting of propyl, cyclopropyl, isopropyl, ethyl and tertiary butyl substituents.

2. The method of combating undesired vegetation which comprises applying to the locus of seeds of the undesired vegetation an effective amount of 3-cyclopropanecarbonylthio-2-chloropropyl N,N-diisopropylthiolcarbamate.

3. The method of combating undesired vegetation which comprises applying to the locus of seeds of the undesired vegetation an effective amount of 3-isobutyrylthio-2-chloropropyl N,N-dipropylthiolcarbamate.

4. The method of combating undesired vegetation which comprises applying to the locus of seeds of the undesired vegetation an effective amount of 3-propanoylthio-2-chloropropyl N,N-dipropylthiolcarbamate.

5. The method of combating undesired vegetation which comprises applying to the locus of seeds of the undesired vegetation an effective amount of 3-propanoylthio-2-chloropropyl N,N-diisopropylthiolcarbamate.

6. The method of combating undesired vegetation which comprises applying to the locus of seeds of the undesired vegetation an effective amount of 3-isovalerylthio-2-chloroprooyl N,N-diisopropylthiolcarbamate.

7. The method of combating undesired vegetation which comprises applying to the locus of seeds of the undesired vegetation an effective amount of 3-isobutyrylthio-2-chloropropyl N,N-diisopropylthiolcarbamate.

8. The method of combating undesired vegetation which comprises applying to the locus of seeds of the undesired vegetation an effective amount of 3-butyrylthio-2-chloropropyl N,N-diisopropylthiolcarbamate.

* * * * *